Sept. 16, 1952  B. P. ADAMS ET AL  2,610,399
RIPPER FOR SEAMS OR THE LIKE
Filed Feb. 4, 1950
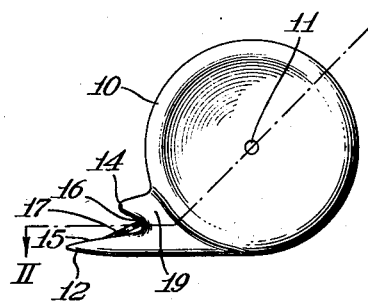
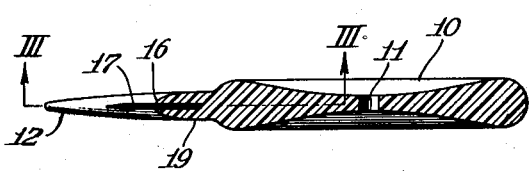
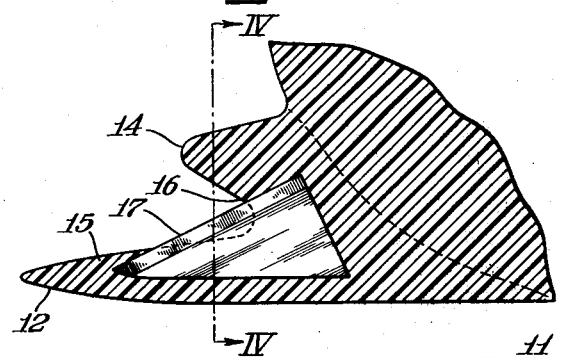
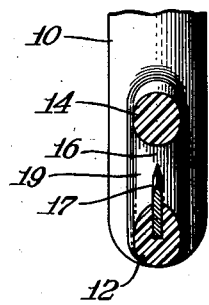
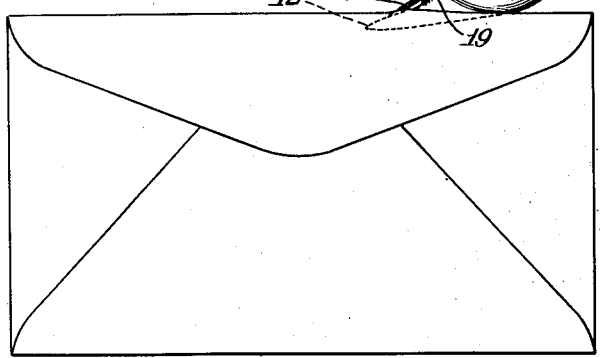
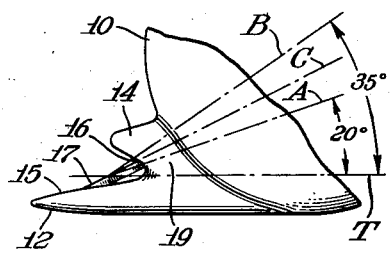
Inventors
Bruce P. Adams,
Joseph Palma Jr. &
J. Gordon Knapp
by The Firm of Charles W. Hills  Attys Patented Sept. 16, 1952

2,610,399

UNITED STATES PATENT OFFICE 2,610,399

RIPPER FOR SEAMS OR THE LIKE

Bruce P. Adams, Evanston, Joseph Palma, Jr., Berwyn, and James Gordon Knapp, Lombard, Ill., assignors to Pelouze Manufacturing Company, Evanston, Ill., a corporation of Illinois Application February 4, 1950, Serial No. 142,474

2 Claims. (Cl. 30—286)

This invention relates to improvements in rippers, and has as its principal objects to provide an improved ripper having a protected cutting blade which may be used for various ripping operations, such as ripping seams, removing buttons, zippers or the like, or may be used for opening letters or cutting paper.

Another object of our invention is to provide a new and improved form of ripper for seams or the like having an open cutting blade guarded to protect the fingers when reaching for the ripper and during operation thereof and to cut nothing but the desired material during insertion of the ripper for ripping and during operation thereof.

A further object of our invention is to provide a simplified and improved form of ripper having a protected recessed cutting edge with a relatively thin tooth-like probe extending therefrom for insertion between the members to be ripped, and guarding against cutting of the material being ripped during insertion of the ripper and during operation thereof.

A further object of our invention is to provide a new and improved form of ripper having a probing tooth extending from a guarded recess and having a cutting blade extending therealong within this recess and arranged at a most efficient angle for cutting or ripping and to give maximum protection to the fingers of the operator of the ripper and the material worked upon.

A still further object of our invention is to provide a novel seam ripper including a relatively flat short gripping member of a disk-like form, with a probing tooth extending along and projecting from one edge thereof and a projecting guard spaced from said probing tooth and extending in the same general direction as said tooth, and with the adjacent face of said tooth forming a guarded blade receiving recess, having a cutting blade imbedded therein and merging into said tooth at a steeper angle than the angle of the adjacent edge of said tooth.

These and other objects of our invention will appear from time to time as the following specification proceeds and with reference to the accompanying drawings wherein:

Figure 1 is a view in side elevation of a ripper constructed in accordance with our invention;

Figure 2 is a sectional view taken substantially along line II—II of Figure 1;

Figure 3 is a fragmentary sectional view taken substantially along line III—III of Figure 2;

Figure 4 is a fragmentary sectional view taken substantially along line IV—IV of Figure 3;

Figure 5 is a view showing the ripper in operation to open an envelope; and

Figure 6 is an enlarged fragmentary view in side elevation illustrating several possible efficient cutting angles of the cutting blade of the ripper.

Referring now to the drawings, our improved form of ripper, as shown therein, includes generally a gripping member 10 herein shown as being of a disk-like form with opposite concave sides, enabling the member to be firmly gripped by the fingers of the operator. A hole 11 is shown as extending through the center of the member and serves as a means for mounting the ripper on a card for display purposes. The member 10 may be made from any suitable material and may preferably be molded from any one of the well known forms of thermo-plastic materials, or may be molded from metal.

An integral tooth-like projection or member 12 much like the tooth of a comb, is herein shown as extending tangentially from the periphery of the gripping member 10. The tooth-like member 12 is tapered toward a point at its free end to provide a probing point which may be inserted between two pieces of cloth tightly sewed together for ripping the thread therebetween without cutting or marring the cloth. The tooth-like member 12 may also readily be inserted under the sealed flap of an envelope, for opening the envelope and for various other like purposes. A guarding projection or lug 14 extends from the gripping member 10 in the same general direction as the tooth-like member 12 and is spaced therefrom, but is considerably shorter than said tooth-like member, so as to guard the cutting blade but not interfere or limit operation of the ripper. The edge of the guard or lug 14 adjacent the tooth 12 is herein shown as being inclined inwardly toward the periphery of the disk 10 and if extended would intersect an upper edge 15 of the tooth-like member 12, said inwardly inclined edge of said lug with said upper edge 15 of said tooth-like member, forms a guarded recess 16 for a cutting blade 17.

The cutting blade 17 is shown as having a cutting edge of razor like sharpness and may be cut from one of the many forms of safety razor blades now on the market. As shown in Figures 2, 3 and 4, the blade 17 is molded in the tooth-like member 12 and in a projecting part 19 of the gripping member 10, which has the tooth-like member 12 and the guard 14 projecting therefrom. The blade 17 merges into the upper edge 15 of the tooth 12 in an area rearwardly of the forward end of said tooth. While the blade 17 is shown as being molded in the part 19 and the tooth-like member 12, it is, of course, obvious that said blade may be secured in other ways and may be detachably mounted if desired.

The angle of the cutting edge of the blade 17 with respect to the upper edge 15 of the tooth-like member 12, into which said blade merges should be such that the blade is fully protected by the guard 14 at all times, so that it cannot cut the fingers during operation of the ripper or when reaching for the ripper in a sewing basket, and will not cut the goods being ripped during operation of the ripper and when inserting the tooth-like member 12 in a seam.

In Figure 6, we show several possible critical limits of the angle of the cutting edge of the blade 17 with respect to a line T drawn parallel to a line drawn tangent to the periphery of the gripping member 10 and along the lower edge of the tooth-like member 12. In this figure, the angle of 20°, represented by broken line A, has been found by experiment to be the minimum practical angle of the cutting edge of the blade 17 that may be used without exposing the blade to the extent that the fingers are likely to be cut thereby, or without unduly lengthening the guard 14. The angle of 35°, represented by broken line B, has been found to be the maximum angle at which the cutting edge of the blade may be set to cut efficiently and while the ripper may cut when the blade is set at an angle of slightly more than 35°, the angle under no circumstances should be as great as 40°. The angle represented by broken line C, however, has been found to be the most efficient angle for all around cutting and ripping, and may be in a neighborhood of 30°, although a variation of a few degrees over or under the 30° setting of the blade has little if any effect on the operation of the blade.

The minimum angle of the cutting edge of the blade 17 is thus determined by the amount of exposure of the blade permissible, without subjecting the fingers to the liability of being cut and without necessitating the extension of the guard 14 to such an extent that it will hinder operation of the ripper. The maximum angle is determined by the angle the blade will cut without clogging or tearing.

It should here be noted that the projecting tooth-like member 12 serves as a probe to bring the blade into position between two pieces of sewed cloth to rip the seam or to position the knife under the flap of an envelope to open the envelope and with the periphery of the disk 10 also determines the angular position of the blade during cutting, assuring that the cutting angle thereof will not be too flat to cut efficiently, as may be clearly seen with reference to Figure 5. The projecting guard 14 likewise limits the steepness of the angle of the cutting edge of the blade during operation of the ripper making it difficult to rip while holding the blade in a position where it will clog, provided the blade is initially set at the proper angle.

It should further be noted that the blade 17 is recessed within the outer limits of the tooth-like member 12 and that the projecting portion 19 into which the tooth-like member 12 and guard 14 merge serves to spread and hold the material apart during the ripping operation, allowing the blade to perform its normal cutting function without interference from the material.

In ripping the thread sewing two pieces of cloth together, the sharp probing end of the tooth-like member 12 may be inserted in the seam between the pieces of cloth. This tooth-like member is sufficiently thin that it may readily do this without injury to the cloth. This operation is effected by gripping opposite sides of the disk 10 with the fingers and inserting the tooth-like member 12 between the two pieces of cloth either directly or with a twisting action, depending upon how tight the cloth is sewed. The ripper may then be positioned in the most convenient manner to cut the threads and drawn along the seam, ripping the thread as it passes therealong, the natural direction being toward the operator. During the ripping or cutting operation, the tooth-like member 12 and the enlarged portion 19 spread and keep the material being ripped or cut spread apart, and the guard 14 protects the goods and fingers of the operator.

It should here be understood that since the gripping member 10 is of a circular form, with the blade 17 extending from the periphery thereof, the ripper may be operated as efficiently while being pushed away from the operator as being pulled toward the operator, and may also be operated with the left hand as well as the right hand with no change in the manner of operation thereof.

It will be understood that modifications and variations may be effected without departing from the scope of the novel concepts of the present invention.

We claim as our invention:

1. In a ripper, a relatively flat circular disk-like gripping member formed of a moldable material and having an integral tooth-like member extending from its perpihery in a direction substantially tangential thereto and tapering toward its end in a spreading probing point for ready insertion for ripping, and also having a guarding projection extending in the same general direction as said tooth-like member in vertically spaced relation with respect theerto and substantially shorter than said tooth-like member, the adjacent edges of said guarding projection and said tooth-like member converging inwardly toward each other and the space between said edges forming a guarded blade receiving recess having a cutting blade extending across said recess and molded in said recess and molded in said tooth-like member and guarding projection and terminating at its outer end in said tooth-like member outside of the margins of said guarding projection, the cutting edge of said blade being inclined at an angle to a line drawn tangent to the periphery of said disk and extending along the outer edge of said tooth-like member, said angle being not less than 20° and not more than 35° and merging into an adjacent edge of said tooth-like member.

2. In a ripper, a substantially circular disk-like gripping member having opposite concave side walls, enabling ready gripping thereof by either hand, an integral tooth-like member projecting from the periphery of said gripping member in a direction substantially tangential thereto, said tooth-like member tapering toward its end to a relatively sharp spreading point for probing and insertion in a seam for ripping, said gripping member also having a guarding projection formed integrally therewith and projecting therefrom adjacent but spaced from said tooth-like member and terminating short of the end of said tooth-like member, the adjacent edges of said guard and said tooth-like member converging inwardly toward said gripping member and the space between the adjacent edges of said guard and tooth-like member forming a guarded recess having a cutting blade extending, across said recess, said blade being secured in and merging into said tooth-like member at a greater angle of inclination than the angle of inclination of the adjacent edge of said tooth-like member and sufficiently in advance of said guarding projection to readily rip the seam without interference from said projection, and the angle of the cutting edge of said blade with respect to a horizontal line parallel to a line drawn tangent to the periphery of said gripping member and extending along the outer edge of said tooth-like member being approximately 30°.

BRUCE P. ADAMS.
JOSEPH PALMA, Jr.
J. GORDON KNAPP.

REFERENCES CITED

The following references are of record in the file of this patent:

UNITED STATES PATENTS

| Number | Name | Date |
| --- | --- | --- |
| 1,728,619 | Lambert | Sept. 17, 1929 |
| 1,898,747 | Schacht | Feb. 21, 1933 |
| 2,380,855 | Lower | July 31, 1945 |
| 2,439,639 | Tilly | Apr. 13, 1948 |

FOREIGN PATENTS

| Number | Country | Date |
| --- | --- | --- |
| 225,802 | Switzerland | July 16, 1943 |